350-96.15 SR

XR 3,312,827

FERROELECTRIC OPTICAL-SHUTTER RADIATION CONVERTER MEANS

Filed April 30, 1963

INVENTOR.

Joseph T. McNaney

United States Patent Office 3,312,827
Patented Apr. 4, 1967

3,312,827

FERROELECTRIC OPTICAL-SHUTTER RADIATION CONVERTER MEANS

Joseph T. McNaney, 8548 Boulder Drive, La Mesa, Calif. 92041

Filed Apr. 30, 1963, Ser. No. 276,870
4 Claims. (Cl. 250—229)

The present invention relates to an improved radiation converter means and more specifically to novel ferroelectric optical-shutter radiation converter means, being capable of receiving, storing and converting radiant energy. Radiation being received may be converted to radiation of higher intensity or a different wavelength, either within the visible spectrum or beyond the visible spectrum.

The converter means herein described utilizes the polarization properties of ferroelectric materials in combination with photoconductor materials to control the establishment of domain rotations across a layer of ferroelectric material corresponding to the intensity and wave-length of radiation exposed to a longitudinally extending layer of photoconductor material. This invention also utilizes the radiation conducting efficiency of optical fiber means for controlling the exposure of the photoconductor layer to radiation and providing a converter means having relatively high gain, sensitivity and resolution capabilities. Upon the establishment of polarized effects in a layer of ferroelectric material in response to input radiation, and in combination with a polarized optical filter, the converter means will be used as an optical shutter in the path of a secondary source of radiation.

Utilizing the principles of ferroelectricity, photoconductivity and fiber optics for essentially storing the effects of a primary source of radiation, these effects may then be used to duplicate the primary source, convert it to a different level of intensity, or, through the use of a secondary source of radiation, convert it to other forms of radiation.

In addition to the objects and advantages aforesaid, it is an object of this invention to provide a radiation converter means which is simple in construction, positive in operation, and trouble-free in continued use.

It is another object of this invention to provide a radiation converter means in the form of an extremely small optical fiber supporting a photoconductor circuit element as a basic constituent of a panel array for supporting a layer of ferroelectric material and an adjoining transparent electrically conductive layer.

It is another object of this invention to provide a basic element which lends itself to the fabrication of panel arrays for converting, for example, infrared images to images within the visible spectrum with extremely high resolution capabilities.

It is another object of this invention to provide a basic element which lends itself to the construction of apparatus for transforming transitory radiant energy into less temporary forms of visual data.

Other objects and advantages will appear hereinafter as a description of the invention proceeds.

The novel features that are considered characteristic of this invention are set forth with particularity in the appended claims. The invention itself, both as to its organization and method of operation, as well as additional objects and advantages, will be best understood from the following description when read in connection with the accompanying drawing in which:

Figure 1:
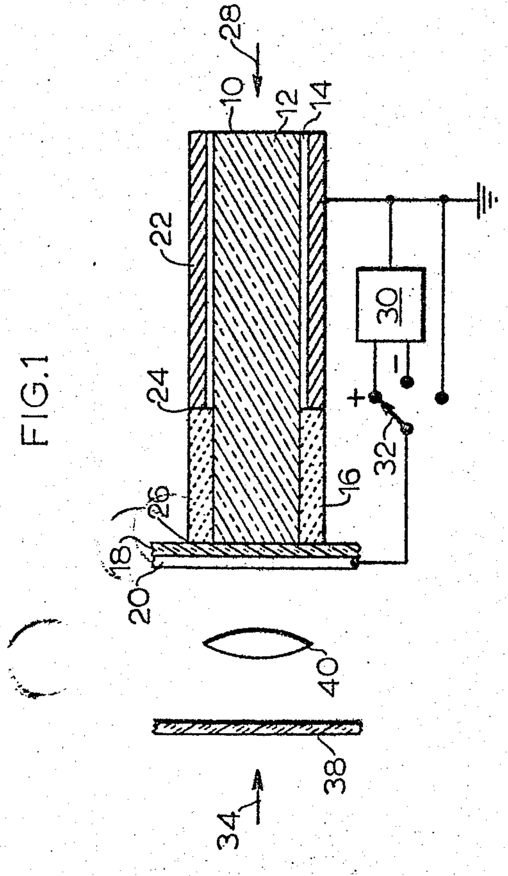
FIGURE 1 is a sectional view of a unitary device embodying the basic concepts of the invention in an embodiment which utilizes optical means for coupling a polarized optical filter to a ferroelectric layer of the device.

Referring now to the embodiment of FIGURE 1, the invention is basically an optical fiber 10, comprising a core 12 and a jacket 14, supporting a longitudinally extending layer 16 of photoconductor material, a layer 18 of ferroelectric material operatively coupled to the photoconductor-optical fiber assembly (10 and 16), a layer 20 of transparent electrically conductive material, and an electrode means 22. The core 12 has a longitudinal dimension exceeding its cross-sectional dimension, a predetermined index of refraction, and an outer surface generally along its longitudinal dimension. The jacket 14 is of a light conductor material having an index of refraction less than the index of the core 12, and intimately joined with the outer surface of the core 12 along a predetermined portion of its longitudinal dimension. The jacket 14 has been removed from a portion of the outer surface of the core 12, allowing the layer 16 of photoconductor material to be disposed upon the outer surface of the core 12 and intimately joined therewith. The layer 16 essentially surrounds the core 12 adjacent the one end thereof, presenting first and second terminals 24 and 26.

Radiant energy will be permitted to enter the optical fiber 10 in the general direction of the arrow 28, and will be conducted through the core 12, by means of a series of internal reflections, to the layer 16 of photoconductor material. This optical fiber means 10 will also be used to conduct radiation to the layer 18 of ferroelectric material.

A voltage from a source 30 will be connected between the conductive material 20 and the electrode means 22, through a switch 32. The layer 20 is intimately joined with the ferroelectric layer 18, and the electrode means 22 is operatively connected to the first terminal 24 of the photoconductor layer 16. The influence of a voltage from the source 30 will be extended to the second terminal 26, and across the ferroelectric layer 18, upon the reflection of radiation to the photoconductor layer 16.

The optical fiber 10 represents a principal part of the invention in that it is the main support for the remaining parts of the invention and, as hereinafter set forth, it performs first and second functions of conducting radiation to the layer 16, and additional functions of conducting radiation to and from the ferroelectric layer. The optical fiber 10 of this invention is generally known and understood in the art as a means of transmitting radiant energy through fiber-like conductors, which can be drawn down to dimensions of less than 25 microns in diameter. The core 12 and jacket 14 assemblies are drawn together to provide an extremely important fire-polished, contamination-free, interface at and along the juncture of the core and jacket. Under these conditions, a jacket of a lower index than the core will function as a very efficient reflector of radiation within, and beyond, the visible spectrum. The jacket thickness, of course, must be taken into consideration since wave energy is required to penetrate the jacket slightly more than a wavelength from the interface if it is to function as a reflector. The core 12 may have, for example, a diameter of 20 microns and the jacket 14 may have a wall thickness from 1 to 10 microns, depending upon the wavelength of the radiation it is designed to handle.

The core 12 and jacket 14 assembly may be made of various types of glass, and also plastics. When designed to handle radiation within the visible spectrum the core, for example, may be made of flint glass with a jacket of crown glass. However, radiation below the visible spectrum, into the near-infrared, will require other types of core and jacket materials. A core of arsenic trisulfide with a jacket of chemically related arsenic sulfide may be designed to conduct radiation extending into infrared of wavelengths measuring from 1 to 8 microns.

The jacket 14 has been removed from a predetermined portion of the core 12 to permit the photoconductor layer 16 to be intimately joined to the outer surface of the core 12 and, thereby, be capable of receiving radiation being conducted through the core 12. The jacket removal may be accomplished by means of any of several well known chemical etching processes.

Photoconductor materials for use in this invention may be selected from a number of well known solids such as lead selenide, lead sulfide, germanium, silicon, cadmium sulphide, or like materials, or combinations of such materials, either in their pure state or in a modified state. When deposited on the outer surface of the core 12, the layer 16 of photoconductor material will take the form of a tubular radiation responsive conductor means having a first terminal 24 and a second terminal 26. The first terminal 24 is in contact with the electrode means 22, and the latter is of an electrical conductor material disposed upon the outer surface of the jacket 14. This electrical conductor material will be used as a binder means for holding together a panel array of the unitary devices of the invention. Insofar as each unitary device is concerned, however, this material will take the form of a tubular electrode means 22, for the purpose of extending the influence of a voltage from the source 30 to the first terminal 24 of the layer 16.

Optically and electrically the layer 18 of ferroelectric material is coupled, respectively, to the optical fiber 10 and the second terminal 26 of the layer 16. The ferroelectric layer 18 may be composed of any suitable known ferroelectric material and vacuum-deposited over the second terminal 26 and the optical fiber 10 having a thickness of about several microns. A homogeneous coating of large crystallites of such material may be obtained in response to the subsequent action of heat in a controlled gaseous atmosphere and of a polarizing electric field. A layer of such material exhibits a domain structure which is visible in polarized light. These domains result from a twinning in the ferroelectric crystal. When such twinning is repeated in a similar plane a series of lamellae is established which may be oriented with respect to the optical axis in response to the application of an electric field across a layer of such material.

The layer 20 of transparent electrically conductive material is disposed upon the outer surface of the ferroelectric layer 18 and will be used as an electrode means, in combination with the electrode means 22, for connecting voltages from the source 30 across the series-connected layers 16 and 18 of the device. The layer 20 may be a relatively thin layer of a well known material produced by the Pittsburgh Plate Glass Company, under the name of "Nesa" transparent conductive material.

A polarized optical filter 38 is optically coupled by means of a lens system 40 to the ferroelectric layer 18, through the transparent layer 20. The filter 38 and the ferroelectric layer 18, in combination, will provide an optical shutter, responsive to voltages applied across the layer 18. When placed in operation, a first voltage polarity connected across the ferroelectric layer 18 will "open" the shutter as a function of the magnitude of the voltage, and a second voltage polarity will be connected across the layer 18 to "close" the shutter.

In operation, the switch 32 will be placed in the position shown so that a positive voltage may be connected to the transparent layer 20 in relation to a neutral, or ground, connection to the electrode means 22. Radiation being exposed to the device in the general direction of the arrow 34 will encounter a "closed" shutter and, therefore, will not be permitted to enter the optical fiber 10. However, radiation being exposed to the device in the general direction of the arrow 28, upon entering the optical fiber 10, will be reflected to the photoconductor layer 16, lower the electrical resistance of the layer 16 intermediate the first terminal 24 and the second terminal 26, and extend the voltage of a positive polarity across the ferroelectric layer 18. The voltage across the layer 18 produces an electrostatic field which establishes domain rotations across the layer 18 corresponding to the intensity of the radiation being reflected to the photoconductor layer 16. The longitudinal dimensions of the layer 16 of photoconductor material will permit the use of a wide range of radiation and voltage effects in effecting domain rotations across the ferroelectric layer 18 as a function of the applied voltage. An interruption of the radiation will leave the layer 18 in a modified polarized state, or, in an open-shutter condition.

Use of the established open-shutter condition will require that the switch 32 be changed to an open, or neutral, position. Radiation from a secondary source of radiation, including wavelengths within the visible spectrum, for example, being exposed to the device in the general direction of the arrow 28 will be viewed through the "open" shutter in the direction of the arrow 34, in the form of polarized radiation. However, radiation within the visible spectrum being exposed to the device in the direction of the arrow 34 will be viewed through the "open" shutter in the direction of the arrow 28, in the form of unpolarized radiation by reason of the radiation having been reflected through the optical fiber means 10. The radiation from the secondary source may be similar to the initial radiation, except for the fact that it may be of a much greater intensity. Or, radiation from the secondary source may be unlike the initial radiation by reason of wavelength, waveform, etc. An open-shutter condition of the converter means of this invention may thereby be used for the admission therethrough of radiation from a second source which may be of a different wavelength or intensity than that of the initial radiation used to effect the "open" shutter.

The closed-shutter condition of the device will be established by changing the position of the switch whereby a negative voltage will be connected to the transparent layer 20 in relation to the ground connection, and exposing the device to a source of radiation from the direction of the arrow 28. Following this action, the device will again be placed in an open-shutter condition, upon changing the switch 32 to the positive polarity and exposing the device to radiation in the general direction of the arrow 28.

As hereinbefore stated, a plurality of the unitary devices of the FIGURE 1 embodiment may be bonded together to form a panel of individual converter elements, for image conversion applications. Such panel arrangements may be used as a means for receiving and intensifying television displays, as one example.

Figure 2:
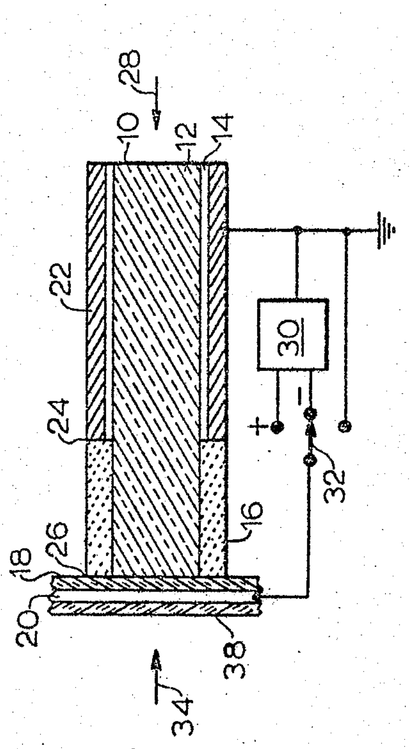
FIGURE 2 is also a sectional view of a unitary device of the invention and represented in an embodiment wherein a polarized optical filter is intimately joined with the device and thereby optically coupled to the ferroelectric layer.

Referring now to the embodiment of FIGURE 2, it will be noted that the only difference between it and the embodiment of FIGURE 1 is that the polarized optical filter 38 is disposed upon and intimately joined with the transparent layer 20. This embodiment, of course, does not require the use of the lens system 40 of FIGURE 1. Otherwise, these two embodiments are similar in construction and operation.

Figure 3:
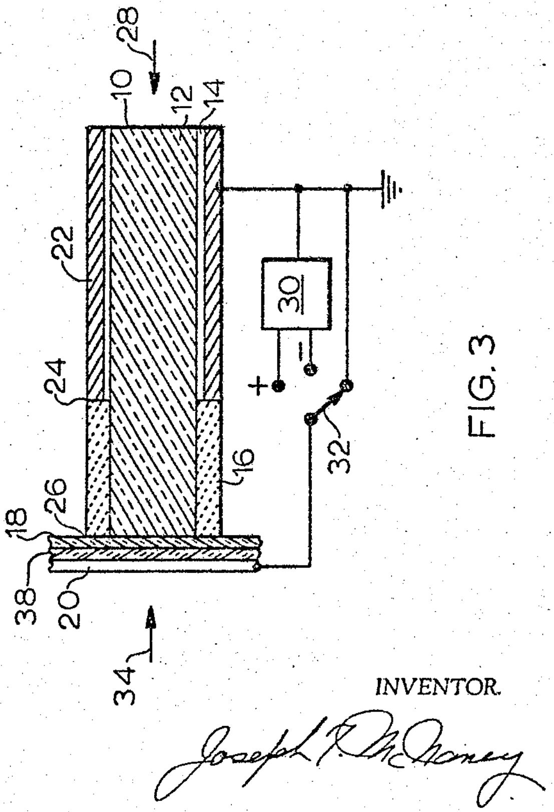
FIGURE 3 is a further embodiment of the invention wherein the polarized filter is disposed intermediate the ferroelectric layer and the transparent electrode of the device.

It will also be noted that the embodiment of FIGURE 3 differs from the embodiment of FIGURE 2, to the extent that the polarized optical filter 38 is sandwiched between the transparent layer 20 and the ferroelectric layer 18. Otherwise, these two embodiments are similar in construction and operation.

Figure 4:
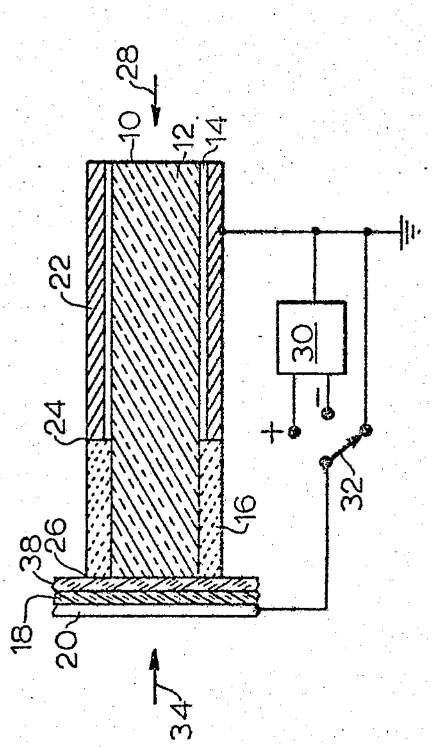
FIGURE 4 is still another embodiment of the invention wherein the polarized filter is disposed intermediate the ferroelectric layer and the photoconductor-optical fiber assembly of the device.

The embodiment of FIGURE 4, it will be noted, differs from the embodiments of FIGURES 2 and 3, in that the polarized optical filter 38 is sandwiched between the ferroelectric layer 18 and the photoconductor-optical fiber assembly (16 and 10). Except for the different positions of the filter 38, all of the embodiments of this invention are alike, and the description of the operation of FIGURE 1 applies equally as well to the FIGURE 2, 3 and 4 embodiments.

Although I have limited myself to the showing of certain embodiments of the invention, it should be understood by those skilled in the arts that the invention is not to be limited in this regard since many of the other embodiments embracing the general principles and construction hereinbefore set forth may be utilized, and still be within the ambit of the present invention.

The particular embodiments of the invention illustrated and described herein are illustrative only, and the invention includes such other modifications and equivalents as may readily appear to those skilled in the arts, and within the scope of the appended claims.

I claim:

1. In a light radiation responsive ferroelectric polarizing means:

(a) photoconductor material presenting first and second terminals;

(b) ferroelectric material presenting first and second surfaces and said second surface electrically coupled to said second terminal;

(c) light radiation conductor means for supporting said photoconductor and ferroelectric materials and controlling the reflection of light radiation to said photoconductor material;

(d) a first source of voltage for providing a first voltage polarity;

(e) means for connecting said voltage polarity of said source between said first terminal and said first surface and, upon a reflection of light through said conductor means to which said photoconductor material is responsive, extending said voltage polarity of said source between said first and second surfaces to establish polarized effects in said ferroelectric material;

(f) a second source of voltage for providing a second voltage polarity; and (g) means for disconnecting said first voltage polarity of said first source, connecting said second voltage polarity of said second source between said first terminal and said first surface and, upon the exposure of said photoconductor material to light radiation to which it is responsive, extending said second voltage polarity of said second source between said first and second surfaces to disestablish said polarized effects in said ferroelectric material.

2. In a light radiation responsive ferroelectric polarizing means:

(a) photoconductor material presenting first and second terminals;

(b) ferroelectric material presenting first and second surfaces and said second surface electrically coupled to said second terminal;

(c) light radiation conductor means, presenting a light admitting end, for supporting said photoconductor and ferroelectric materials and controlling the reflection of light radiation to said photoconductor material from said end;

(d) a first source of voltage for providing a first voltage polarity;

(e) means for connecting said voltage polarity of said source between said first terminal and said first surface and, upon a reflection of light from said end to said photoconductor material, extending said voltage polarity of said source between said first and second surfaces so as to establish polarized effects in said ferroelectric material;

(f) a second source of voltage for providing a second voltage polarity;

(g) means for disconnecting said first voltage polarity of said first source and connecting said second voltage polarity of said second source between said first terminal and said first surface; and (h) means for exposing said photoconductor material to light incident to said first surface and admitted through said ferroelectric material from said first surface to said photoconductor material, and extending said second voltage polarity of said second source between said first and second surfaces so as to disestablish said polarized effects in said ferroelectric material.

3. In a light radiation responsive ferroelectric polarizing means:

(a) photoconductor material presenting first and second terminals;

(b) ferroelectric material presenting first and second surfaces and said second surface electrically coupled to said second terminal;

(c) light radiation conductor means for supporting said photoconductor and ferroelectric materials and controlling the reflection of light radiation to said photoconductor material;

(d) a first source of voltage for providing a first voltage polarity;

(e) means for connecting said voltage polarity of said source between said first terminal and said first surface and, upon a reflection of light through said conductor means to which said photoconductor material is responsive, extending said voltage polarity of said source between said first and second surfaces for establishing polarized effects in said ferroelectric material;

(f) means for disconnecting said first voltage polarity of said source, connecting a neutral electrical influence between said first terminal and said first surface and utilizing polarized effects established in said ferroelectric material for controlling the passage of light radiation therethrough;

(g) a second source of voltage for providing a second voltage polarity; and (h) means for connecting said second voltage polarity of said second source between said first terminal and said first surface and, upon the exposure of said photoconductor material to light radiation to which it is responsive, extending said second voltage polarity of said second source between said first and second surfaces for disestablishing polarized effects in said ferroelectric material.

4. In a light radiation responsive ferroelectric polarizing means:

(a) photoconductor material presenting first and second terminals;

(b) ferroelectric material presenting first and second surfaces and said second surface electrically coupled to said second terminal;

(c) light radiation conductor means for supporting said photoconductor and ferroelectric materials, presenting a light radiation admitting end, and having a predetermined index of refraction for controlling the reflection of light radiation from said end to said photoconductor material;

(d) a first source of voltage for providing a first voltage polarity with means for connecting said polarity of said source of voltage between said first terminal and said first surface and, upon a reflection of light radiation from said end to said photoconductor material, utilizing said polarity of said source of voltage to establish polarized effects in said ferroelectric material independent of said predetermined index of refraction;

(e) a second source of voltage for providing a second voltage polarity with means for connecting said second polarity of said second source of voltage between said first terminal and said first surface; and (f) means for exposing said photoconductor material to light radiation incident to said first surface and admitted through said ferroelectric material to said photoconductor material, and utilizing said second voltage polarity of said second source of voltage to disestablish said polarized effects in said ferroelectric material independent of said predetermined index of refraction.

References Cited by the Examiner

UNITED STATES PATENTS

| | | | |
|---|---|---|---|
| 2,765,411 | 10/1956 | Kerr | 250—227 X |
| 3,047,867 | 7/1962 | McNaney | 250—227 X |
| 3,208,342 | 9/1965 | Nethercot | 88—1 |

WALTER STOLWEIN, *Primary Examiner.*

RALPH G. NILSON, *Examiner.*